United States Patent [19]

Allen et al.

[11] 4,337,962
[45] Jul. 6, 1982

[54] HANDLEBAR MOUNTING ASSEMBLY

[75] Inventors: David A. Allen, La Verne; Jay D. Witala, West Covina, both of Calif.

[73] Assignee: Huffy Corporation, Miamisburg, Ohio

[21] Appl. No.: 203,299

[22] Filed: Nov. 3, 1980

[51] Int. Cl.³ .............................................. B62K 21/18
[52] U.S. Cl. .................................. 280/279; 74/551.1; 403/245; D12/118
[58] Field of Search ............... 280/279, 276; 74/551.1, 74/551.3, 551.6; 403/245, 230, 374; D12/117, 118

[56] References Cited

U.S. PATENT DOCUMENTS

| D. 252,922 | 9/1979 | Cook et al. | D12/118 |
|---|---|---|---|
| D. 253,589 | 12/1979 | Horton | D12/118 |
| 3,385,615 | 5/1968 | Hussey | 74/551.6 |
| 3,391,582 | 7/1968 | Polley, Jr. | 74/551.1 |
| 3,874,701 | 4/1975 | Soong | 403/374 |

*Primary Examiner*—Richard A. Bertsch
*Assistant Examiner*—Donn Mc Giehan
*Attorney, Agent, or Firm*—Biebel, French & Nauman

[57] ABSTRACT

The handlebar for a bicycle or similar vehicle is clamped by a pair of pillow blocks which are bolted to a first plate which in turn is attached to the bicycle stem. The first plate has a portion stamped outwardly to form a second plate connected to the first plate and angularly disposed with respect to it. A rim is also pressed out of the plane of the first plate along the edge of the opening formed by stamping out the second plate, and an upper portion of the bicycle stem is received in the opening in the first plate and permanently attached to it by means of a fillet weld around the opening at the lower surface of the first plate. The undersurface of the second plate bears against the upper end of the stem and is bolted to it by a bolt that extends through the second plate and the stem.

7 Claims, 4 Drawing Figures

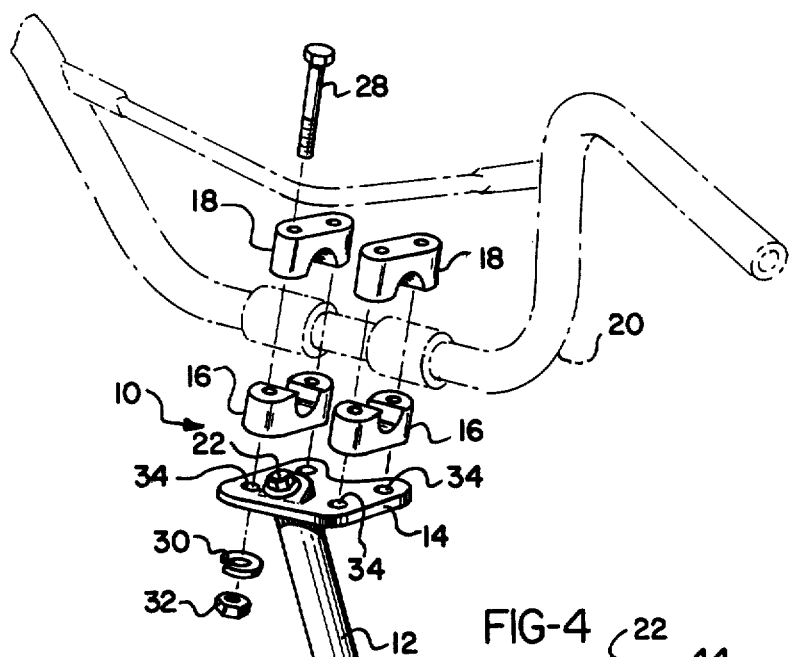
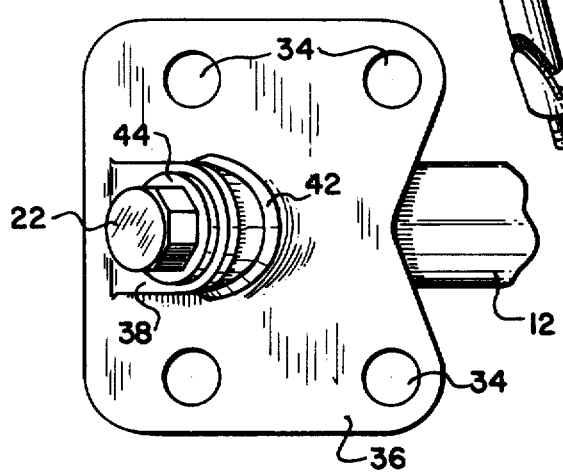
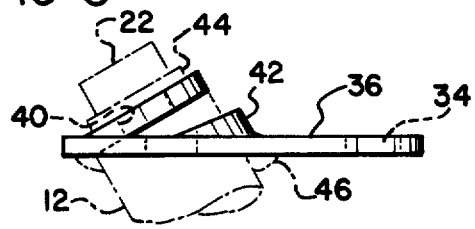

HANDLEBAR MOUNTING ASSEMBLY

BACGROUND OF THE INVENTION

In certain types of bicycles and similar vehicles it is desirable to clamp the handlebar between so called pillow blocks, which are opposed blocks having semicircular openings formed along their opposing surfaces to fit around and engage the handlebar. U.S. Pat. No. D253,589, dated Dec. 4, 1979, shows a construction of this general type. In this patent a bottom block is bolted to a bicycle stem by the bolt which also engages a wedge nut for interconnecting the stem to the bicycle front fork. A smaller plate is then bolted to the lower plate to clamp the handlebar in position.

In certain bicycle designs it is also desirable to have the pillow blocks disposed at an angle other than perpendicularly with respect to the axis of the bicycle stem. U.S. Pat. No. D252,922, dated Sept. 18, 1979, discloses one approach to this design. In this patent a flat plate has an opening formed through it and the bicycle stem is received in this opening and fixed in place by welds running around the opening at the upper and lower surfaces of the plate. A pair of pillow blocks are then mounted on the plate by means of bolts which extend through the four openings formed through the plate outwardly of the stem. This construction requires double welds, at the top and bottom of the plate, and if the welds should fail the plate and the handlebars attached to it would be separated from the stem.

SUMMARY OF THE INVENTION

The present invention provides a handlebar mounting assembly which permits the pillow blocks to be disposed at an acute angle with respect to the axis of the bicycle stem, does not require double welds and provides a bolted as well as a welded interconnection between the pillow block mounting plate and the bicycle stem.

Specifically, a first plate is provided having a second plate displaced from the plane of the first plate to form an opening receiving the bicycle stem. A rim is also displaced from the plane of the first plate and engages a portion of the stem to provide greater contact between the plate and the stem and improved stability.

When the stem is positioned in the opening in the first plate the upper end of the stem bears against the lower surface of the second plate and the second plate has an opening formed in it through which passes a bolt which also threadably engages at its lower end a wedge nut.

The first plate is permanently attached to the stem by means of a fillet weld around the stem at the lower surface of the plate. As a result the plate for mounting the pillow blocks is attached to the stem by both a bolted and a welded connection so that if the weld should fail there will remain the bolted connection to prevent the handlebars from separating from the stem.

These and other advantages and features of the present invention will become more apparent from the following description.

BRIEF DESCRIPTION OF THE DRAWINGS

FIG. 1 is an exploded perspective view of the assembly of the present invention showing a handlebar in phantom lines;

FIG. 2 is a top view of the pillow block mounting with the pillow blocks removed from clarity;

FIG. 3 is a side view of the mounting plate with the stem and bolt shown in phantom lines; and FIG. 4 is a side view showing the mounting plate attached to a bicycle stem.

DESCRIPTION OF THE PREFERRED EMBODIMENT

With reference to FIG. 1 of the drawings, it will be seen that a stem assembly 10 in accordance with the present invention includes a bicycle stem weldment 12, a mounting plate 14, pairs of upper and lower pillow blocks 16 and 18, and a handlebar 20. The stem weldment 12 is hollow and receives a bolt having a head 22 and a threaded shank; a portion 24 of which extends outwardly from the lower end of the stem weldment 12 and is received in a complementarily threaded wedge nut 26.

The pillow blocks are attached to the plate 14 by means of four bolts, washers and nuts, one of each of which is shown at 28, 30 and 32, respectively, which pass through the pillow blocks and the openings 34 in the plate 14.

The plate 14, as perhaps better seen in FIGS. 2 and 3 of the drawings, includes a first flat plate member 36 from which is displaced by, for example, stamping, a second plate member 38 attached along its edge to the plate member 36 and extending at an angle of approximately 30° with respect thereto.

Displacement of the second plate member 38 from the material of the first plate member 36 results in an opening through the plate member 36 of a size sufficient to receive the stem 12. Also, the plate member 38 has an opening 40 through it of a size sufficient to receive the shank of the bolt passing through the hollow stem weldment 12.

Preferably a rim 42 is also displaced from the plate member and engages that portion of the stem weldment projecting through the opening in the plate member 36.

With this construction it will be seen that the upper end of the stem weldment bears against the lower surface of the second plate member 38 and can be bolted thereto by means of the bolt passing through the hollow stem weldement 12 and threadably engaging the wedge nut 26. Preferably a washer 44 is also interposed between the bolt head 22 and the upper surface of the second plate 38, as also seen in FIG. 4 of the drawings. The first plate member 36 is then attached to the stem weldment 12 by means of a fillet weld 44, which extends completely around the stem weldment at the lower surface of the plate member 36.

From the above description it will be seen that the receipt of the stem weldment in the opening through the first plate member 36 and its engagement with the inner surface of the rim 42 and the lower surface of the plate 38 provides substantial surface contact between the mounting plate 14 and the stem weldment 12 for improved stability. Additionally, the use of double welds is eliminated and a bolted, as well as a welded connection is provided.

While the form of apparatus herein described constitutes a preferred embodiment of the invention, it is to be understood that the invention is not limited to this precise form of apparatus, and that changes may be made therein without departing from the scope of the invention.

What is claimed is:

1. In a stem assembly including a hollow stem weldment, a bolt having a head and a threaded shank, said bolt extending through said stem weldment with said head positioned outwardly of an upper end of said stem weldment and a portion of said threaded shank projecting from a lower end of said stem weldment, and a wedge nut threaded on said portion of said threaded shank, an improved pillow block mounting comprising:

- a first plate member having an opening formed therethrough,
- a second plate member attached to said first plate member in non-planar relationship thereto,
- means defining an opening through said second plate member,
- a rim projecting from said first plate member adjacent said opening therethrough,
- an upper portion of said stem weldment being received in said opening in said first plate member,
- said bolt adjacent said head thereof being received in said opening in said second plate member, and
- means fixing said first plate member to said stem weldment.

2. The assembly of claim 1 wherein said first and second plate members are substantially planar and angularly disposed with respect to each other.

3. The assembly of claim 2 wherein:
said second plate member is displaced from the material of said first plate member to form said opening through said first plate member.

4. The assembly of claim 1 wherein:
said rim is displaced from the material of said first plate member.

5. The assembly of claim 1 wherein:
said rim is positioned oppositely to the point at which said second plate member is attached to said first plate member.

6. The assembly of claim 1 wherein:
said means fixing said first plate member to said stem weldment comprises a weld at the undersurface of said first plate member.

7. In a stem assembly including a hollow stem weldment, a bolt having a head and a threaded shank, said bolt extending through said stem weldment with said head positioned outwardly of an upper end of said stem weldment and a portion of said threaded shank projecting from a lower end of said stem weldment, and a wedge nut threaded on said portion of said threaded shank, an improved pillow block mounting comprising:

- a first, substantially flat plate member, a second, substantially flat plate member pressed from the material of said first plate member to form an opening through said first plate member,
- said second plate member being disposed at an angle of approximately 30° with respect to said first plate member,
- said second plate member having an opening formed thrererthrough and receiving said bolt with said head thereof positioned adjacent an upper surface of said second plate member,
- said stem weldment being received in said opening formed in said first plate member with an upper end thereof abutting a lower surface of said first plate member,
- a rim displaced from the material of said first plate member opposite the point of attachment of said second plate member to said first plate member,
- said rim engaging an outer surface of said stem weldment, and
- a continuous fillet weld at the undersurface of said first plate member fixing said first plate member to said stem weldment.

* * * * *